(12) United States Patent
Xie et al.

(10) Patent No.: US 10,614,803 B2
(45) Date of Patent: Apr. 7, 2020

(54) WAKE-ON-VOICE METHOD, TERMINAL AND STORAGE MEDIUM

(71) Applicant: BAIDU ONLINE NETWORK TECHNOLOGY (BEIJING) CO., LTD., Beijing (CN)

(72) Inventors: Bo Xie, Beijing (CN); Sheng Qian, Beijing (CN); Yang Sun, Beijing (CN); Yan Xie, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 86 days.

(21) Appl. No.: 15/854,880

(22) Filed: Dec. 27, 2017

(65) Prior Publication Data
US 2019/0005954 A1 Jan. 3, 2019

(30) Foreign Application Priority Data
Jun. 30, 2017 (CN) .......................... 2017 1 0525422

(51) Int. Cl.
*G10L 15/22* (2006.01)
*G10L 15/30* (2013.01)
(Continued)

(52) U.S. Cl.
CPC .............. *G10L 15/22* (2013.01); *G10L 15/02* (2013.01); *G10L 15/063* (2013.01); *G10L 15/08* (2013.01);
(Continued)

(58) Field of Classification Search
CPC .......... G10L 15/28; G10L 15/30; G10L 15/22
See application file for complete search history.

(56) References Cited

U.S. PATENT DOCUMENTS 9,548,053 B1 * 1/2017 Basye ................... G06F 16/683
9,697,828 B1 * 7/2017 Prasad .................... G10L 15/18
(Continued)

FOREIGN PATENT DOCUMENTS

| CN | 104769668 | 7/2015 |
| CN | 106611597 | 5/2017 |

OTHER PUBLICATIONS

SIPO, First Office Action for CN Application No. 201710525422.4, dated Sep. 30, 2019.

*Primary Examiner* — Douglas Godbold
(74) *Attorney, Agent, or Firm* — Hodgson Russ LLP

(57) ABSTRACT

The present disclosure provides a wake-on-voice method, a terminal and a storage medium. The method includes: acquiring a wake-up voice configured to wake up a smart terminal; performing an analysis on an acoustic feature of the wake-up voice by using a preset acoustic model and a preset wake-up word recognition network of the smart terminal, so as to acquire a confidence coefficient of the acoustic feature of the wake-up voice with respect to an acoustic feature of a preset wake-up word; determining whether the confidence coefficient falls in a preset range of moderate confidence coefficients, if yes, uploading the wake-up voice to a remote server; and determining whether a linguistic feature obtained by analyzing the wake-up voice using a linguistic model matches to a linguistic feature of the preset wake-up word, if yes, receiving an instruction to wake up the smart terminal generated by the remote server.

15 Claims, 8 Drawing Sheets

--- an instruction to add the wake-up word and a text sequence of a wake-up word to be added is acquired by a webpage associated to the remote server

↓ the text sequence of the wake-up word to be added is added in a database storing a text sequence of the preset wake-up word in the remote server

↓ a wake-up word recognition network is established by acquiring voice information of the wake-up word to be added and an acoustic feature of the preset wake-up word, and an original wake-up word recognition network is replaced by the new wake-up word recognition network, such that the wake-up word can added

(51) Int. Cl.
*G10L 15/08* (2006.01)
*G10L 15/06* (2013.01)
*G10L 15/02* (2006.01)

(52) U.S. Cl.
CPC ........ *G10L 15/30* (2013.01); *G10L 2015/088* (2013.01); *G10L 2015/223* (2013.01)

(56) References Cited

U.S. PATENT DOCUMENTS

| | | | |
|---|---|---|---|
| 9,734,822 B1 * | 8/2017 | Sundaram | G10L 15/08 |
| 9,899,021 B1 * | 2/2018 | Vitaladevuni | G10L 15/142 |
| 2015/0154953 A1 * | 6/2015 | Bapat | G10L 15/06 704/251 |
| 2015/0287413 A1 * | 10/2015 | Jung | G10L 15/32 704/231 |
| 2018/0190281 A1 * | 7/2018 | Tang | G10L 15/22 |
| 2019/0027130 A1 * | 1/2019 | Tsunoo | G06F 17/2735 |

* cited by examiner

WAKE-ON-VOICE METHOD, TERMINAL AND STORAGE MEDIUM

CROSS-REFERENCE TO RELATED APPLICATIONS

This application is based on and claims priority of Chinese Patent Application No. 201710525422.4, filed on Jun. 30, 2017, the entire contents of which are incorporated herein by reference.

FIELD

The present disclosure relates to the voice recognition technology, and more particularly to a wake-on-voice method, a wake-on-voice apparatus, a terminal and a storage medium.

BACKGROUND

At present, worldwide popular smart hardware including echo, google home and the like has a voice interaction function. A main interacting manner is to say a wake-up word firstly. For example, the smart hardware "google home" may be woke up only when a user says "hello google", and then the user can give a specific instruction such as listening to news or listening to music.

In prior art, one or more fixed wake-up words are generally used to wake up a smart terminal. However, users have their own personalized requirements. For example, one user would like to replace the original wake-up word of his/her phone with "Tianyao" according to his/her interests. The user's requirement of customizing a wake-up word has not been realized in prior art.

SUMMARY

Embodiments of the present disclosure provide a wake-on-voice method, a wake-on-voice apparatus, a terminal and a storage medium.

Embodiments of a first aspect of the present disclosure provide a wake-on-voice method. The wake-on-voice method may include: acquiring a wake-up voice configured to wake up a smart terminal; performing an analysis on an acoustic feature of the wake-up voice by using a preset acoustic model and a preset wake-up word recognition network of the smart terminal, so as to acquire a confidence coefficient of the acoustic feature of the wake-up voice with respect to an acoustic feature of a preset wake-up word; determining whether the confidence coefficient falls in a preset range of moderate confidence coefficients, and if yes, uploading the wake-up voice to a remote server; and determining whether a linguistic feature obtained by analyzing the wake-up voice using a linguistic model in the remote server matches to a linguistic feature of the preset wake-up word, and if yes, receiving an instruction to wake up the smart terminal generated by the remote server.

Embodiments of a second aspect of the present disclosure provide a wake-on-voice apparatus. The wake-on-voice apparatus may include: a voice acquiring module, configured to acquire a wake-up voice configured to wake up a smart terminal; an acoustic feature matching module, configured to perform an analysis on an acoustic feature of the wake-up voice by using a preset acoustic model and a preset wake-up word recognition network of the smart terminal, so as to acquire a confidence coefficient of the acoustic feature of the wake-up voice with respect to an acoustic feature of a preset wake-up word; a voice uploading module, configured to determine whether the confidence coefficient falls in a preset range of moderate confidence coefficients, and if yes, to upload the wake-up voice to a remote server; and a linguistic feature matching module, configured to determine whether a linguistic feature obtained by analyzing the wake-up voice using a linguistic model in the remote server matches to a linguistic feature of the preset wake-up word, and if yes, to receive an instruction to wake up the smart terminal generated by the remote server.

Embodiments of a third aspect of the present disclosure provide a terminal. The terminal may include: one or more processors; a memory; one or more programs stored in the memory, that when executed by the one or more processors, cause the one or more processors to perform the wake-on-voice method according to the first aspect of the present disclosure.

Embodiments of a fourth aspect of the present disclosure provide a computer readable storage medium storing computer programs, when the computer programs are executed, configured to perform the wake-on-voice method according to the first aspect of the present disclosure.

DETAILED DESCRIPTION

Figure 1:
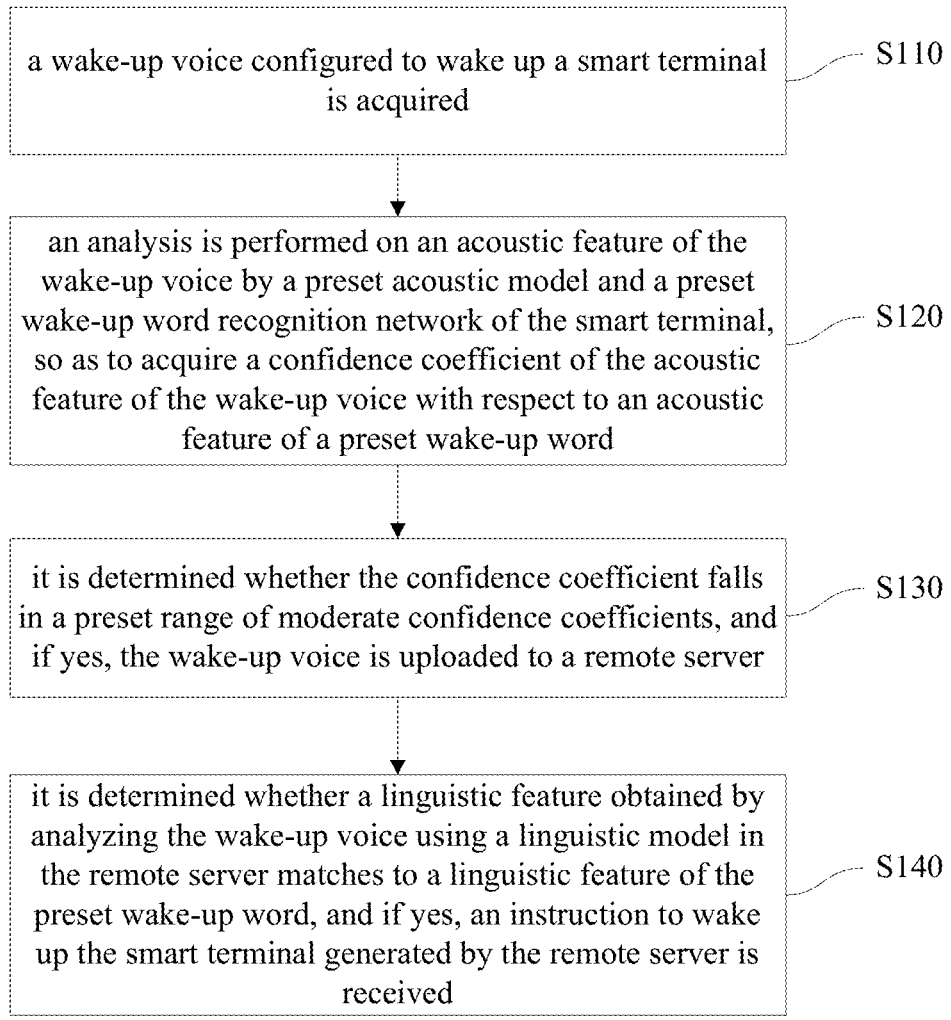
FIG. 1 is a flow chart of a wake-on-voice method according to a first embodiment of the present disclosure.

Reference will be made in detail to embodiments of the present disclosure, where the same or similar elements and the elements having same or similar functions are denoted by like reference numerals throughout the descriptions. The embodiments described herein with reference to drawings are explanatory, and used to generally understand the present disclosure. The embodiments shall not be construed to limit the present disclosure.

First Embodiment

FIG. 1 is a flow chart of a wake-on-voice method according to a first embodiment of the present disclosure. This embodiment may be applied to a smart terminal. The wake-on-voice method may be performed by a wake-on-voice apparatus realized by software and/or hardware. Alternatively, the wake-on-voice apparatus may be configured in the smart terminal. As shown in FIG. 1, the wake-on-voice method includes the following acts.

At block S110, a wake-up voice configured to wake up a smart terminal is acquired.

The wake-up voice may be acquired by any conventional method in prior art. Alternatively, the wake-up voice may be acquired by monitoring surrounding voice information in time, or by acquiring surrounding voice information after a wake-on-voice triggering instruction is received.

Specifically, the wake-on-voice triggering instruction may realize the trigger mechanism thereof by pressing one or more preset physical keys or by clicking virtual keys displayed on a touch screen of the smart terminal.

At block S120, an analysis is performed on an acoustic feature of the wake-up voice by using a preset acoustic model and a preset wake-up word recognition network of the smart terminal, so as to acquire a confidence coefficient of the acoustic feature of the wake-up voice with respect to an acoustic feature of a preset wake-up word.

The preset acoustic model may be considered as a voice modeling, which is able to convert a voice input into an acoustic representation for outputting. More particularly, the preset acoustic model may provide possibilities of states corresponding to a voice frame. The preset acoustic model may be a convolutional neural network model, a deep neural network model and the like. The preset acoustic model is acquired by training massive voice data. It is well known that, a pronunciation of a word consists of phonemes, the states mentioned above may be considered as a voice unit finer than the phoneme. Generally, one phoneme may be divided as three states. Voice recognition may be realized by recognizing the voice frames as states, combining the states into the phonemes, and combining the phonemes into words.

The preset wake-up word recognition network may be established according to pronounce information of a same preset wake-up word from a lot of individuals, a preset junk word list and similar pronounce information. The established preset wake-up word recognition network may include a state path corresponding to the preset wake-up word. The wake-up voice may be related to the preset wake-up word via the state path. The pronounce information of a wake-up word forms a syllable of the wake-up word. The pronounce information of the wake-up word may be found according to a text of the wake-up word or matched to the voice of the wake-up word. The similar pronounce information may consist of similar syllables of each syllable corresponding to the wake-up word. The junk word list may be generated in advance, for example, a decoder may be formed by combining all phonemes in a phoneme-base, massive voices may be input into the decoder, and one or more most-frequently outputted results may be selected from the outputted results as the junk word list.

Specifically, performing an analysis on an acoustic feature of the wake-up voice by using a preset acoustic model and a preset wake-up word recognition network of the smart terminal, so as to acquire a confidence coefficient of the acoustic feature of the wake-up voice with respect to an acoustic feature of the preset wake-up word may include: extracting the acoustic feature of the wake-up voice; performing an analysis on the acoustic feature of the wake-up voice according to the preset acoustic model, so as to acquire N states corresponding to the wake-up voice and likelihood values of the N states, where N is a positive integer; and determining a possibility of synthesizing the N states into the acoustic feature of the preset wake-up word from the preset wake-up word recognition network according to the likelihood values based on a viterbi algorithm and regarding the possibility as the confidence coefficient.

As the preset wake-up word recognition network is established according to pronounce information of the preset wake-up word, the preset wake-up word recognition network only includes state paths corresponding to the preset wake-up word. An optimized path determined from the preset wake-up word recognition network according to the likelihood values and based on a viterbi algorithm may include the state path corresponding to the preset wake-up word. Therefore, the possibility corresponding to the optimized path may be the possibility of synthesizing the N states into the acoustic feature of the preset wake-up word.

At block S130, it is determined whether the confidence coefficient falls in a preset range of moderate confidence coefficients, and if yes, the wake-up voice is uploaded to a remote server.

The preset range of moderate confidence coefficients may be set as required. In order to reduce a stress of the remote server when uploading the wake-up voice to the remote server, a lower limit of the preset range of moderate confidence coefficients may be set as high as possible under a condition of ensuring an accuracy of a wake-up process.

Particularly, if the confidence coefficient is greater than the upper limit of the preset range, an operation to wake up the smart terminal is performed. If the confidence coefficient is smaller than a lower limit of the preset range, the wake-up voice is ignored.

At block S140, it is determined whether a linguistic feature obtained by analyzing the wake-up voice using a linguistic model in the remote server matches to a linguistic feature of the preset wake-up word, and if yes, an instruction to wake up the smart terminal generated by the remote server is received.

The linguistic model is an abstract mathematical model established based on objective facts of language. The linguistic model is used to solve problems caused by polyphones. After the acoustic model provides a pronounce sequence, a character string sequence having the greatest possibility, selected from candidate text sequences, may be considered as the text sequence corresponding to the wake-up voice. The linguistic feature of the wake-up word may refer to a semantic feature and/or a text feature of the wake-up word.

Specifically, determining whether a linguistic feature obtained by analyzing the wake-up voice using a linguistic model in the remote server matches to a linguistic feature of the preset wake-up word may include: generating a text sequence corresponding to the wake-up voice by the linguistic model based on an analyzing result of the acoustic feature of the wake-up voice acquired by using the preset acoustic model; and determining the text sequence corresponding to the wake-up voice as the linguistic feature of the wake-up voice, and matching the text sequence corresponding to the wake-up voice to the linguistic feature of the preset wake-up word (i.e., a text sequence corresponding to the preset wake-up word).

The linguistic feature of the preset wake-up word may be stored in a database of the remote server.

Figure 2:
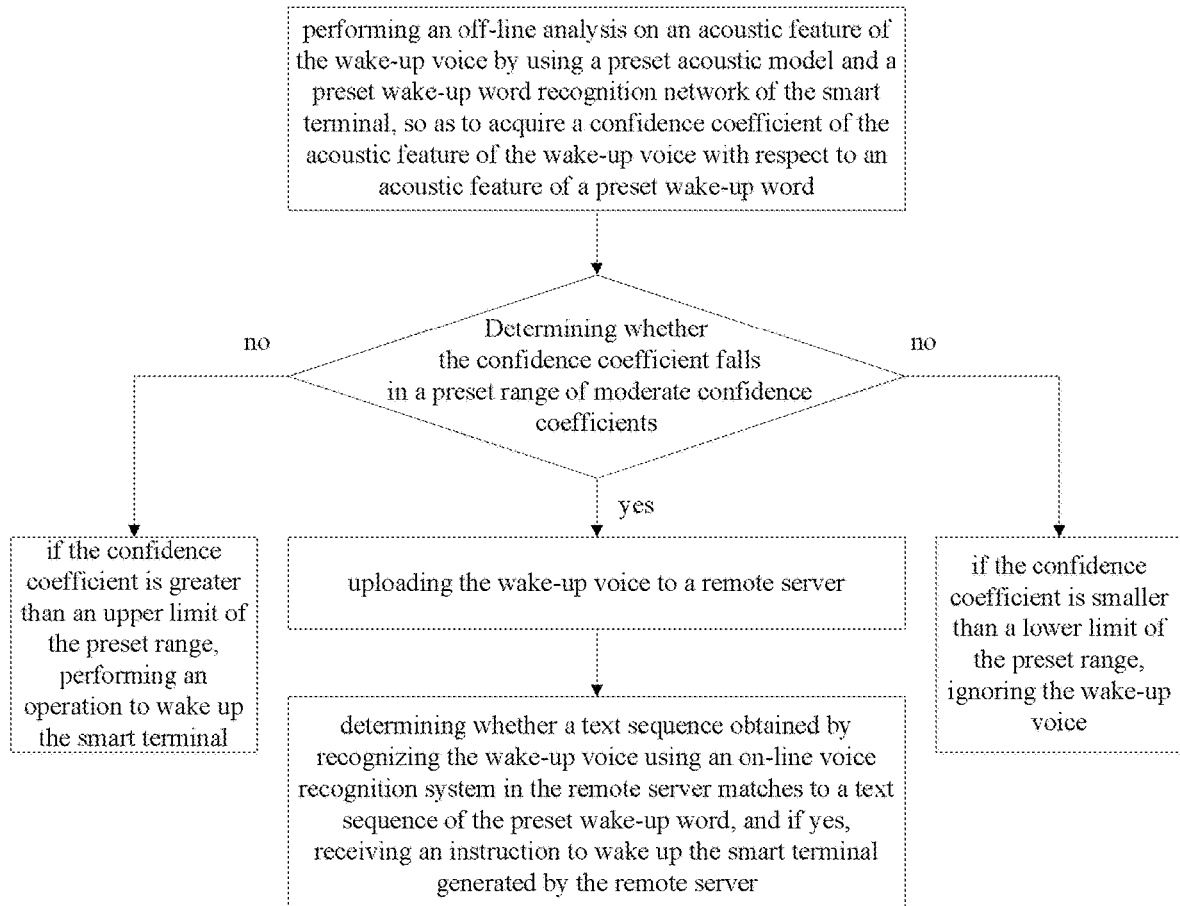
FIG. 2 is a flow chart of another wake-on-voice method according to the first embodiment of the present disclosure.

FIG. 2 is a flow chart of another wake-on-voice method according to the first embodiment of the present disclosure.

Referring to FIG. 2, in practical applications, the wake-on-voice method may include: acquiring a wake-up voice configured to wake up a smart terminal; performing an off-line analysis on an acoustic feature of the wake-up voice by using a preset acoustic model and a preset wake-up word recognition network of the smart terminal, so as to acquire a confidence coefficient of the acoustic feature of the wake-up voice with respect to an acoustic feature of a preset wake-up word; determining whether the confidence coefficient falls in a preset range of moderate confidence coefficients, and if yes, uploading the wake-up voice to a remote server; if the confidence coefficient is greater than an upper limit of the preset range, performing an operation to wake up the smart terminal; if the confidence coefficient is smaller than a lower limit of the preset range, ignoring the wake-up voice; and determining whether a text sequence obtained by recognizing the wake-up voice using an on-line voice recognition system in the remote server matches to a text sequence of the preset wake-up word, and if yes, receiving an instruction to wake up the smart terminal generated by the remote server.

It should be understood that, the preset acoustic model and the preset wake-up word recognition network in the smart terminal may be used to perform the off-line analysis on the acoustic feature of the wake-up voice. If the confidence coefficient is high, the wake-up operation is performed, and if the confidence coefficient falls in the preset range of moderate confidence coefficients, the wake-up voice is uploaded to the remote server. Therefore, massive traffic may be avoided and the overloading problem of the remote server caused by uploading the wake-up voice to a cloud server when waking up the smart terminal using a custom wake-up word or more than one wake-up word may be solved.

With the technical solution provided by embodiments of the present disclosure, a confidence coefficient of the acoustic feature of the wake-up voice with respect to an acoustic feature of a preset wake-up word may be determined via a preset wake-up word recognition network, such that the smart terminal may be woke up offline. The wake-up word may be customized by replacing the preset wake-up word recognition network with a wake-up word recognition network established according to voice information of a custom wake-up word. Moreover, as the accuracy of the wake-up word recognition network established by using one or few pieces of voice information of the custom wake-up word may be low, there may be a problem of a low recognition accuracy rate and a wake-up misoperation. With embodiments of the present disclosure, wake-up voices failing to realize an off-line wake-up may be uploaded to a remote server, an analysis and a matching may be performed thereon using a linguistic model and the linguistic feature of a preset wake-up word in the remote server, such that the above problem may be solved. Meanwhile, a customizing of the wake-up word may be realized by replacing the linguistic feature of the preset wake-up word, thereby satisfying a requirement of customizing the wake-up word.

In order to improve the efficiency of recognizing the voice of the wake-up word by the linguistic model, after it is determined that the linguistic feature obtained by analyzing the wake-up voice using the linguistic model in the remote server matches to the linguistic feature of the preset wake-up word, the wake-on-voice method may also include: performing a training on the linguistic model in the remote server using the wake-up voice.

In order to customize the wake-up word, the wake-on-voice method may also include: acquiring a wake-up word custom triggering instruction and wake-up word data to be processed of the smart terminal, and performing a processing on the preset wake-up word recognition network and the linguistic feature of the preset wake-up word according to the wake-up word custom triggering instruction and the wake-up word data to be processed.

Typically, performing a processing on the preset wake-up word recognition network and the linguistic feature of the preset wake-up word according to the wake-up word custom triggering instruction and the wake-up word data to be processed may include: if the wake-up word custom triggering instruction is configured to replace a wake-up word, replacing the preset wake-up word recognition network with a wake-up word recognition network established by using voice information of a wake-up word to be processed in the wake-up word data to be processed, and replacing the linguistic feature of the preset wake-up word with a text sequence of the wake-up word to be processed in the wake-up word data to be processed.

Specifically, the wake-up word custom triggering instruction at least can be configured to delete a wake-up word, to replace a wake-up word and to add a wake-up word.

Alternatively, a trigger mechanism of the wake-up word custom triggering instruction includes clicking a virtual button on a webpage and/or playing preset audio data.

Second Embodiment

Figure 3:
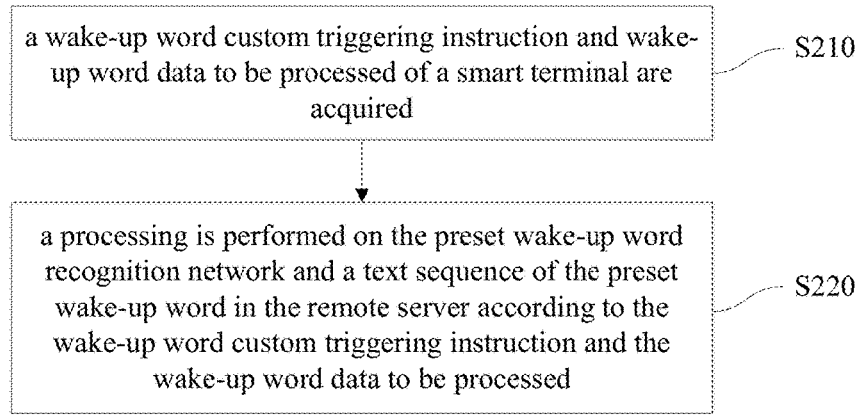
FIG. 3 is a flow chart of a wake-on-voice method according to a second embodiment of the present disclosure.

FIG. 3 is a flow chart of a wake-on-voice method according to a second embodiment of the present disclosure. This embodiment provides an alternative solution based on the first embodiment. Referring to FIG. 3, the wake-on-voice method according to the second embodiment may include followings.

At block S210, a wake-up word custom triggering instruction and wake-up word data to be processed of a smart terminal are acquired.

The wake-up word data to be processed corresponds to the wake-up word custom triggering instruction. For example, if the wake-up word custom triggering instruction is configured to replace a wake-up word, the wake-up word data to be processed may be text and/or voice information of a new wake-up word.

Specifically, the wake-up word custom triggering instruction at least can be configured to delete a wake-up word, to replace a wake-up word and to add a wake-up word.

Alternatively, a trigger mechanism of the wake-up word custom triggering instruction includes clicking a virtual button on a webpage and/or playing preset audio data.

At block S220, a processing is performed on the preset wake-up word recognition network and a text sequence of the preset wake-up word in the remote server according to the wake-up word custom triggering instruction and the wake-up word data to be processed.

Figure 4A:
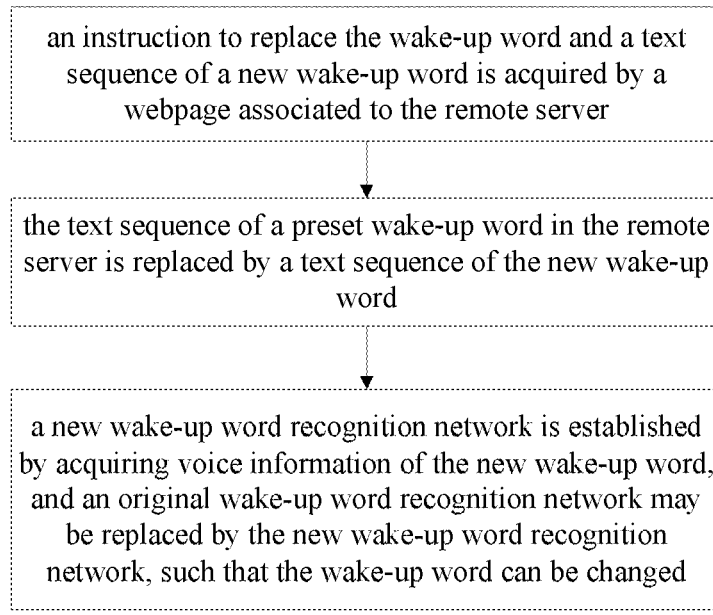
FIG. 4a is a flow chart of a method of replacing a wake-up word according to the second embodiment of the present disclosure.

Specifically, FIG. 4a is a flow chart of a method of replacing a wake-up word according to the second embodiment of the present disclosure. Referring to FIG. 4a, an instruction to replace the wake-up word and a text sequence of a new wake-up word may be acquired by a webpage associated to the remote server. The text sequence of a preset wake-up word in the remote server may be replaced by a text sequence of the new wake-up word. A new wake-up word recognition network may be established by acquiring voice information of the new wake-up word, and an original wake-up word recognition network may be replaced by the new wake-up word recognition network, such that the wake-up word can be changed.

Figure 4B:
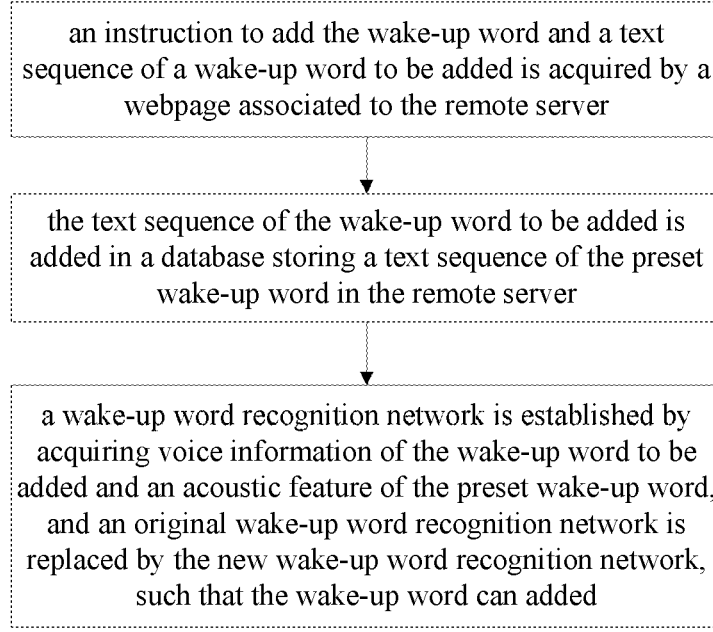
FIG. 4b is a flow chart of a method of adding a wake-up word according to the second embodiment of the present disclosure.

Specifically, FIG. 4b is a flow chart of a method of adding a wake-up word according to the second embodiment of the present disclosure. Referring to FIG. 4b, an instruction to add the wake-up word and a text sequence of a wake-up word to be added may be acquired by a webpage associated to the remote server. The text sequence of the wake-up word to be added may be added in a database storing a text sequence of the preset wake-up word in the remote server. A wake-up word recognition network may be established by acquiring voice information of the wake-up word to be added and an acoustic feature of the preset wake-up word, and an original wake-up word recognition network may be replaced by the new wake-up word recognition network, such that the wake-up word can be added.

Figure 4C:
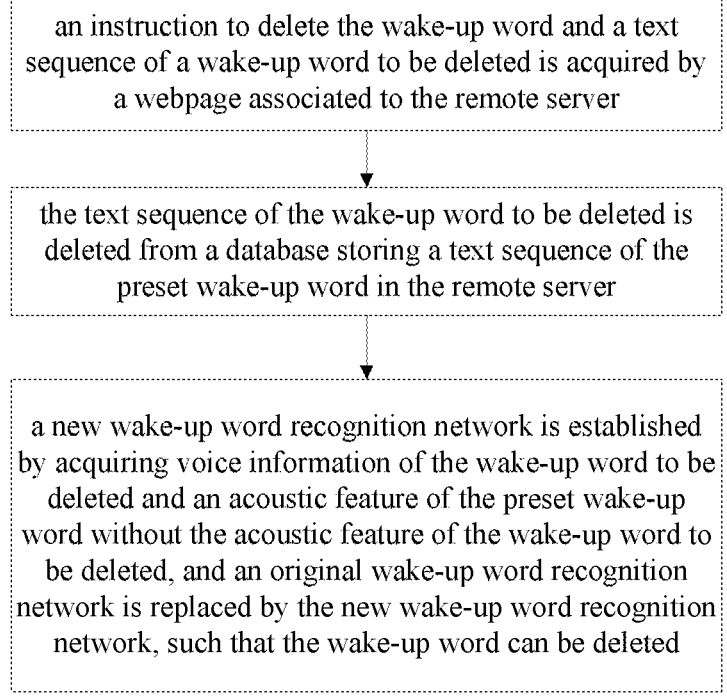
FIG. 4c is a flow chart of a method of deleting a wake-up word according to the second embodiment of the present disclosure.

Specifically, FIG. 4c is a flow chart of a method of deleting a wake-up word according to the second embodiment of the present disclosure. Referring to FIG. 4c, an instruction to delete the wake-up word and a text sequence of a wake-up word to be deleted may be acquired by a webpage associated to the remote server. The text sequence of the wake-up word to be deleted may be deleted from a database storing a text sequence of the preset wake-up word in the remote server. A new wake-up word recognition network may be established by acquiring voice information of the wake-up word to be deleted and an acoustic feature of the preset wake-up word without the acoustic feature of the wake-up word to be deleted, and an original wake-up word recognition network may be replaced by the new wake-up word recognition network, such that the wake-up word can be deleted.

Figure 5A:
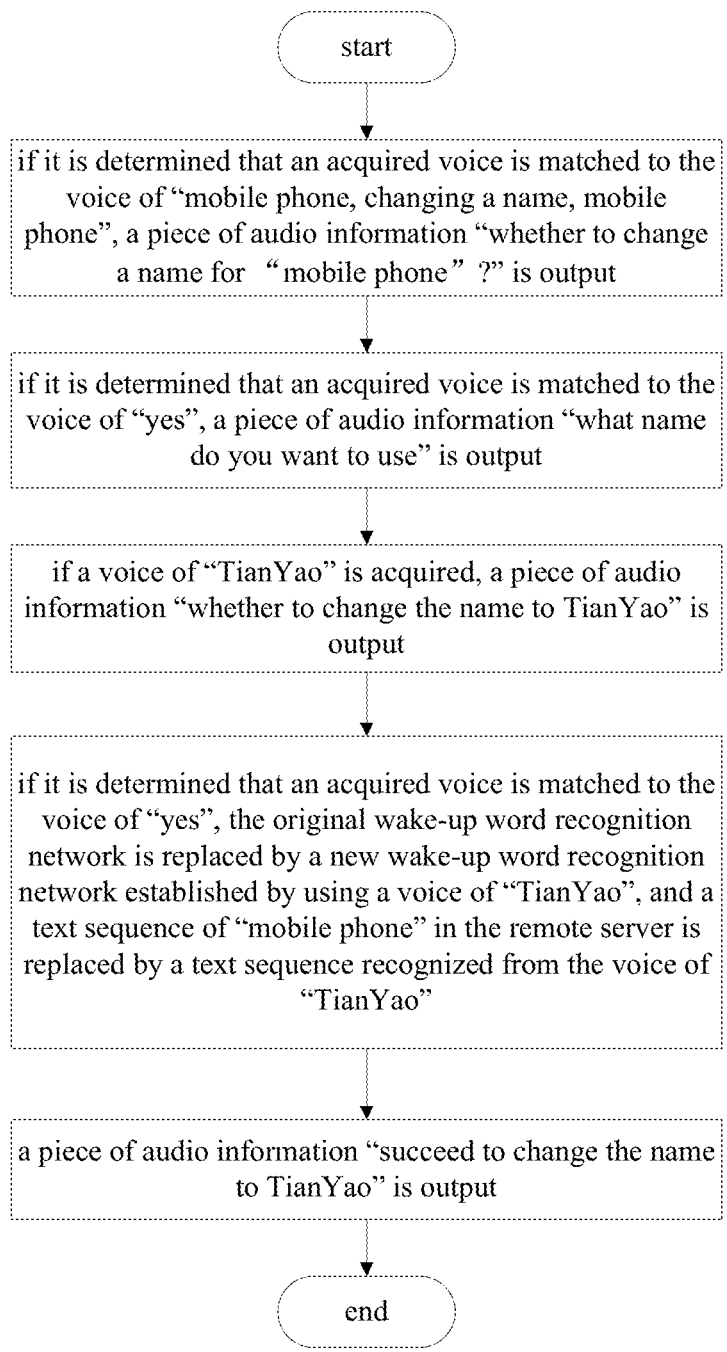
FIG. 5a is a flow chart of another method of replacing a wake-up word according to the second embodiment of the present disclosure.

In practical applications, the customizing of the wake-up word may be triggered according to preset audio data provided by a user. FIG. 5a is a flow chart of another method of replacing a wake-up word according to the second embodiment of the present disclosure. Referring to FIG. 5a, for example, the preset audio data is a piece of voice of "original wake-up word, changing a name, original wake-up word", in which the original wake-up word is "mobile phone", a new wake-up word is "TianYao". The process for replacing the wake-up word may be described as follows: if it is determined that an acquired voice is matched to the voice of "mobile phone, changing a name, mobile phone", a piece of audio information "whether to change a name for "mobile phone"?" may be output; if it is determined that an acquired voice is matched to the voice of "yes", a piece of audio information "what name do you want to use" may be output; if a voice of "TianYao" is acquired, a piece of audio information "whether to change the name to TianYao" may be output; if it is determined that an acquired voice is matched to the voice of "yes", the original wake-up word recognition network may be replaced by a new wake-up word recognition network established by using a voice of "TianYao", and a text sequence of "mobile phone" in the remote server may be replaced by a text sequence recognized from the voice of "TianYao"; and a piece of audio information "succeed to change the name to TianYao" may be output.

Figure 5B:
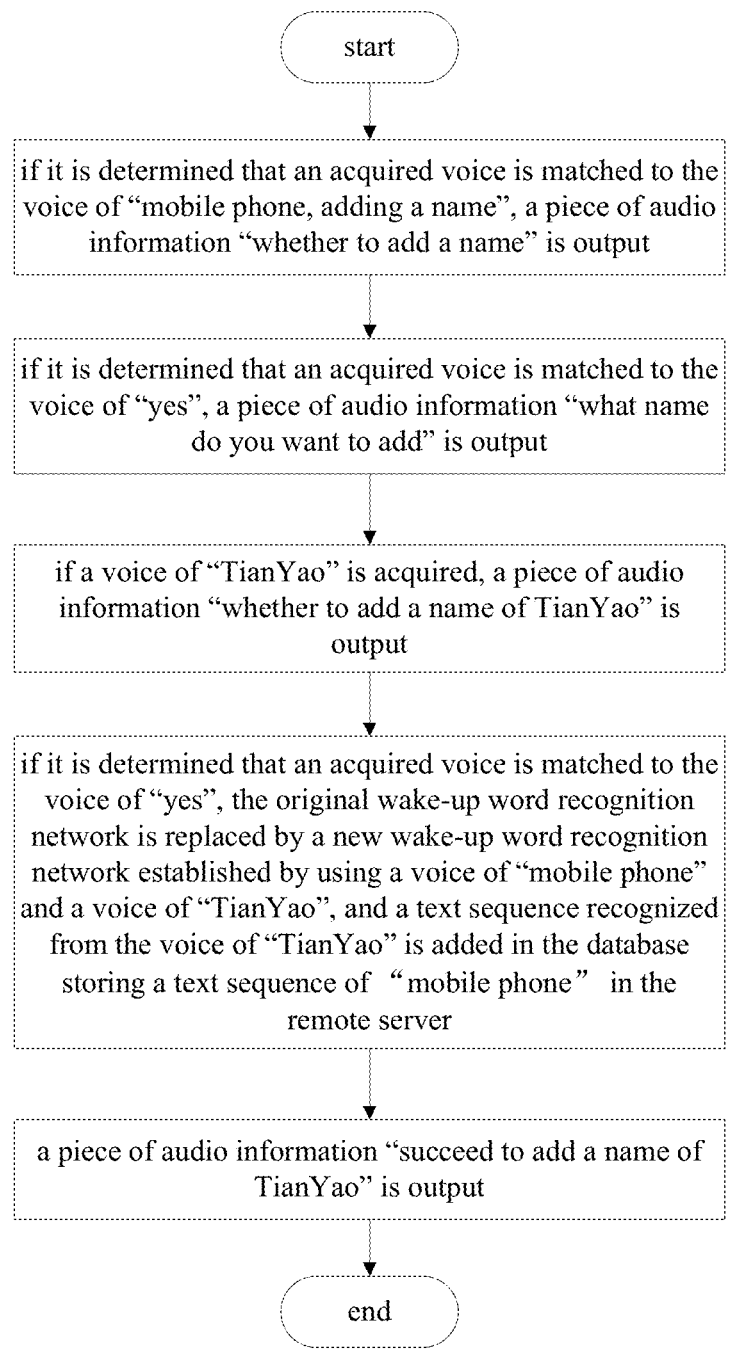
FIG. 5b is a flow chart of another method of adding a wake-up word according to the second embodiment of the present disclosure.

FIG. 5b is a flow chart of another method of adding a wake-up word according to the second embodiment of the present disclosure. Referring to FIG. 5b, for example, the preset audio data is a piece of voice of "original wake-up word, adding a name", in which the original wake-up word is "mobile phone", a wake-up word to be added is "TianYao". The process for adding the wake-up word may be described as follows: if it is determined that an acquired voice is matched to the voice of "mobile phone, adding a name", a piece of audio information "whether to add a name" may be output; if it is determined that an acquired voice is matched to the voice of "yes", a piece of audio information "what name do you want to add" may be output; if a voice of "TianYao" is acquired, a piece of audio information "whether to add a name of TianYao" may be output; if it is determined that an acquired voice is matched to the voice of "yes", the original wake-up word recognition network may be replaced by a new wake-up word recognition network established by using a voice of "mobile phone" and a voice of "TianYao", and a text sequence recognized from the voice of "TianYao" may be added in the database storing a text sequence of "mobile phone" in the remote server; and a piece of audio information "succeed to add a name of TianYao" may be output.

Figure 5C:
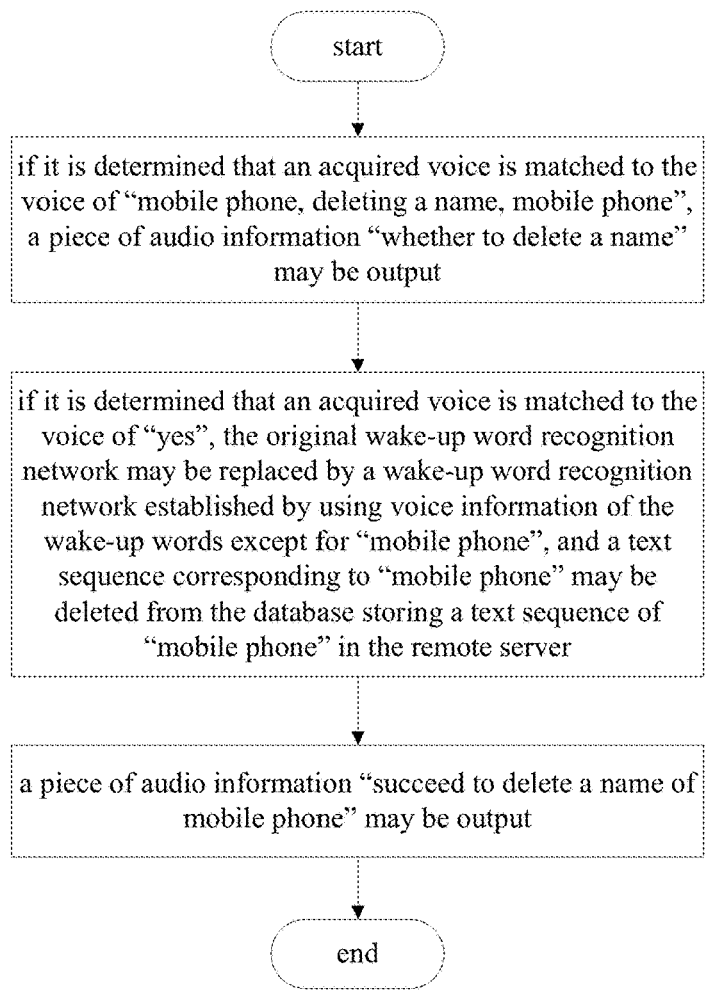
FIG. 5c is a flow chart of another method of deleting a wake-up word according to the second embodiment of the present disclosure.

FIG. 5c is a flow chart of another method of deleting a wake-up word according to the second embodiment of the present disclosure. Referring to FIG. 5c, for example, the preset audio data is a piece of voice of "original wake-up word, deleting a name, original wake-up word", in which the original wake-up word and a wake-up word to be deleted are "mobile phone". The process for deleting the wake-up word may be described as follows: if it is determined that an acquired voice is matched to the voice of "mobile phone, deleting a name, mobile phone", a piece of audio information "whether to delete a name" may be output; if it is determined that an acquired voice is matched to the voice of "yes", the original wake-up word recognition network may be replaced by a wake-up word recognition network established by using voice information of the wake-up words except for "mobile phone", and a text sequence corresponding to "mobile phone" may be deleted from the database storing a text sequence of "mobile phone" in the remote server; and a piece of audio information "succeed to delete a name of mobile phone" may be output.

With technical solutions of this embodiment, a preset wake-up word recognition network and a text sequence of a preset wake-up word may be edited, such that the wake-up word may be added, deleted and replaced. In addition, more than one wake-up word may be stored in the database by adding the wake-up word.

Third Embodiment

Figure 6:
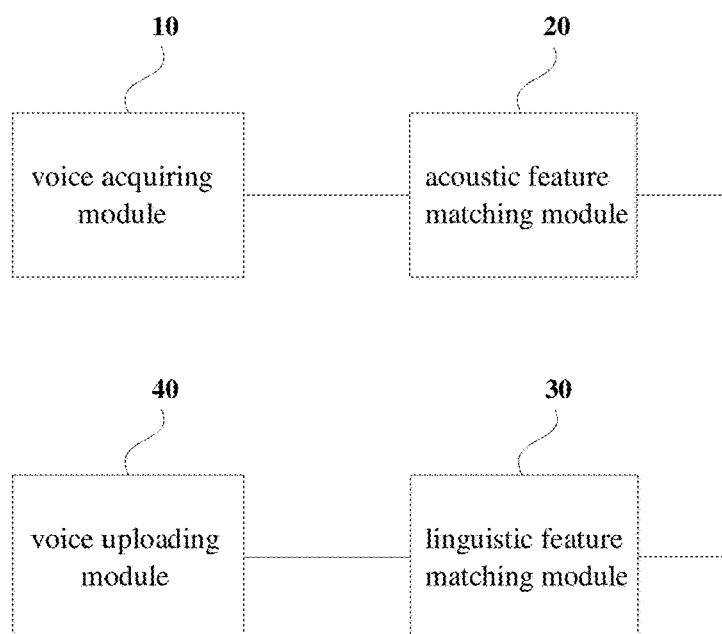
FIG. 6 is a block diagram of a wake-on-voice apparatus according to a third embodiment of the present disclosure.

FIG. 6 is a block diagram of a wake-on-voice apparatus according to a third embodiment of the present disclosure. Referring to FIG. 6, the wake-on-voice apparatus provided by embodiments of the present disclosure may include: a voice acquiring module 10, an acoustic feature matching module 20, a voice uploading module 30 and a linguistic feature matching module 40.

The voice acquiring module 10 is configured to acquire a wake-up voice configured to wake up a smart terminal.

The acoustic feature matching module 20 is configured to perform an analysis on an acoustic feature of the wake-up voice by using a preset acoustic model and a preset wake-up word recognition network of the smart terminal, so as to acquire a confidence coefficient of the acoustic feature of the wake-up voice with respect to an acoustic feature of a preset wake-up word.

The voice uploading module 30 is configured to determine whether the confidence coefficient falls in a preset range of moderate confidence coefficients, and if yes, to upload the wake-up voice to a remote server.

The linguistic feature matching module 40 is configured to determine whether a linguistic feature obtained by analyzing the wake-up voice using a linguistic model in the remote server matches to a linguistic feature of the preset wake-up word, and if yes, to receive an instruction to wake up the smart terminal generated by the remote server.

With the technical solution according to embodiments of the present disclosure, a confidence coefficient of the acoustic feature of the wake-up voice with respect to an acoustic feature of a preset wake-up word may be determined by using a preset wake-up word recognition network, thus an off-line wake-up of a smart terminal may be realized. By replacing the preset wake-up word recognition network with a wake-up word recognition network established by using voice information of a custom wake-up word, the wake-up word may be customized In addition, since an accuracy of the wake-up word recognition network established by using one or few pieces of voice information of the custom wake-up word may be low, it may cause a problem of a low recognition accuracy rate and a wake-up misoperation. With embodiments of the present disclosure, wake-up voices failing to realize an off-line wake-up may be uploaded to a remote server, an analysis and a matching may be performed thereon using a linguistic model and a linguistic feature of a preset wake-up word in the remote server, such that the above problem may be solved. Meanwhile, a customizing of the wake-up word may be realized by replacing the linguistic feature of the preset wake-up word, thereby satisfying a requirement of customizing the wake-up word.

Further, the wake-on-voice apparatus may also include a linguistic training module.

The linguistic training module is configured to perform a training on the linguistic model in the remote server using the wake-up voice if it is determined that the linguistic feature obtained by analyzing the wake-up voice using the linguistic model in the remote server matches to the linguistic feature of the preset wake-up word.

Further, the wake-on-voice apparatus may also include a wake-up word customizing module.

The wake-up word customizing module is configured to acquire a wake-up word custom triggering instruction and wake-up word data to be processed of the smart terminal, and to perform a processing on the preset wake-up word recognition network and the linguistic feature of the preset wake-up word according to the wake-up word custom triggering instruction and the wake-up word data to be processed.

Fourth Embodiment

Figure 7:
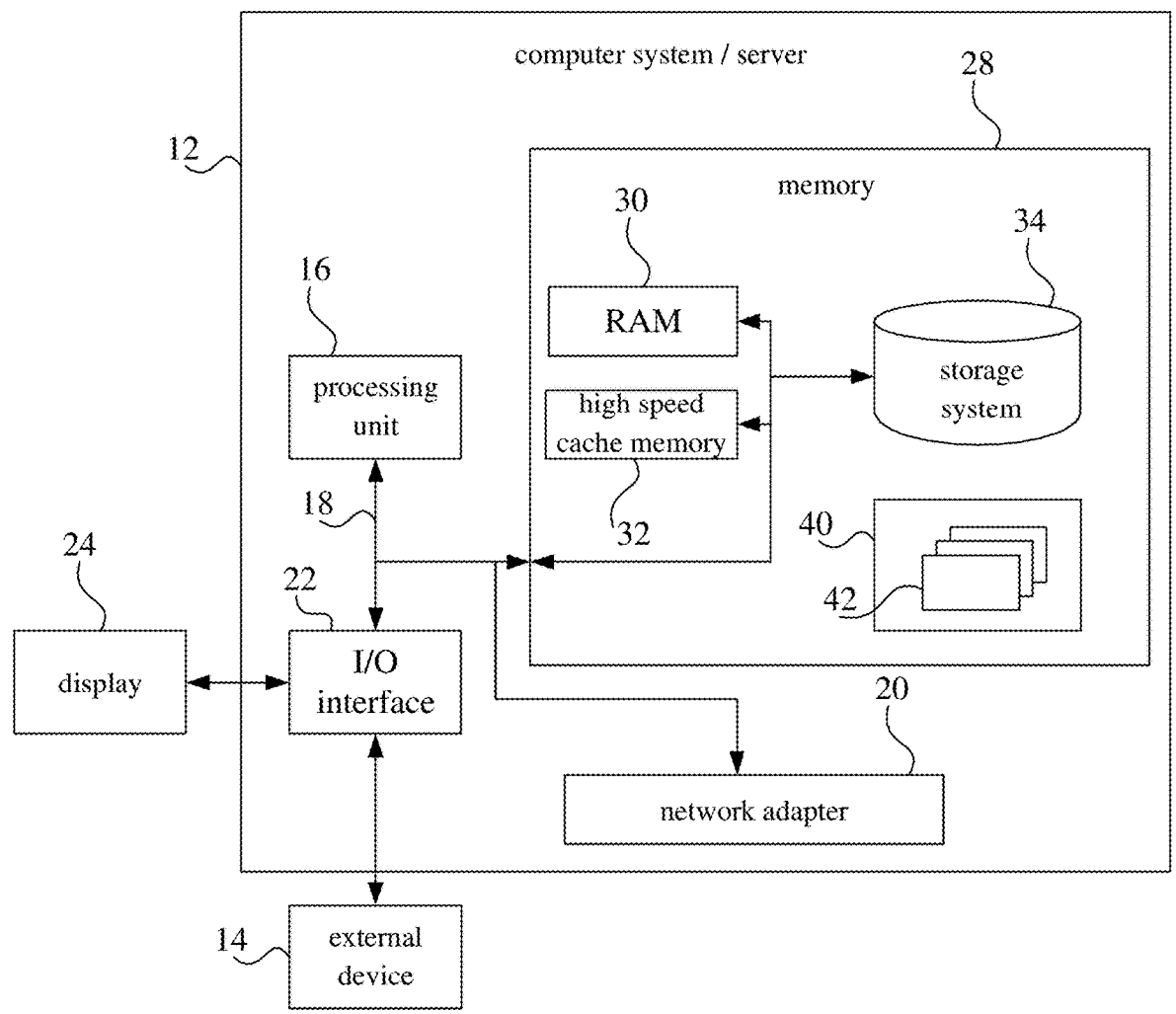
FIG. 7 is a block diagram of a terminal according to a fourth embodiment of the present disclosure.

FIG. 7 is a block diagram of a terminal according to a fourth embodiment of the present disclosure. FIG. 7 illustrates a block diagram of an example terminal 12 suitable for applying implementations of the present disclosure. The terminal 12 shown in FIG. 7 is merely an example, which should not be considered as a limitation on function and scope of embodiments of the present disclosure.

As illustrated in FIG. 7, the terminal 12 may be represented in a form of a general-purpose computing device. Components of the terminal 12 may include but are not limited to one or more processors or processing units 16, a system memory 28, a bus 18 connecting various system components including the system memory 28 and the processing units 16.

The bus 18 represents one or more of any of several types of bus structures, including a memory bus or a memory controller, a peripheral bus, an accelerated graphics port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The terminal 12 typically includes a variety of computer system readable media. These media may be any available media accessible by the terminal 12 and includes both volatile and non-volatile media, removable and non-removable media.

The system memory 28 may include a computer system readable medium in the form of volatile memory, such as a random access memory (hereinafter referred to as RAM) 30 and/or a high speed cache memory 32. The terminal 12 may further include other removable or non-removable, volatile or non-volatile computer system storage media. By way of example only, the storage system 34 may be configured to read and write a non-removable and non-volatile magnetic media (not shown in FIG. 7, commonly referred to as a "hard drive"). Although not shown in FIG. 7, a magnetic disk driver for reading from and writing to a removable and non-volatile magnetic disk (such as "floppy disk") and a disk driver for reading from and writing to a removable and non-volatile optical disk (such as compact disk read only memory (hereinafter referred to as CD-ROM), Digital Video Disc Read Only Memory (hereinafter referred to as DVD-ROM) or other optical media can be provided. In these cases, each driver may be connected to the bus 18 via one or more data medium interfaces. The memory 28 may include at least one program product. The program product has a set (such as, at least one) of program modules configured to perform the functions of various embodiments of the present disclosure.

A program/utility 40 having a set (at least one) of the program modules 42 may be stored in, for example, the memory 28. The program modules 42 include but are not limited to, an operating system, one or more application programs, other programs modules, and program data. Each of these examples, or some combination thereof, may include an implementation of a network environment. The program modules 42 generally perform the functions and/or methods in the embodiments described herein.

The terminal 12 may also communicate with one or more external devices 14 (such as, a keyboard, a pointing device, a display 24, etc.). Furthermore, the terminal 12 may also communicate with one or more devices enabling a user to interact with the terminal 12 and/or other devices (such as a network card, modem, etc.) enabling the terminal 12 to communicate with one or more computer devices. This communication can be performed via the input/output (I/O) interface 22. Also, the terminal 12 may communicate with one or more networks (such as a local area network (hereafter referred to as LAN), a wide area network (hereafter referred to as WAN) and/or a public network such as an Internet) through a network adapter 20. As shown in FIG. 7, the network adapter 20 communicates with other modules of the terminal 12 over the bus 18. It should be understood that, although not shown in FIG. 7, other hardware and/or software modules may be used in conjunction with the terminal 12. The hardware and/or software includes, but is not limited to, microcode, device drivers, redundant processing units, external disk drive arrays, RAID systems, tape drive and data backup storage system.

The processing unit 16 is configured to execute various functional applications and data processing by running programs stored in the system memory 28, for example, implementing the wake-on-voice method provided in embodiments of the present disclosure.

Fifth Embodiment

The fifth embodiment of the present disclosure further provides a computer readable storage medium including a computer program. When the computer program is executed by a processor, the processor is configured to perform the wake-on-voice method provided in embodiments of the present disclosure.

The above computer storage medium may adopt any combination of one or more computer readable medium(s). The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. More specific examples (a non-exhaustive list) of the computer readable storage medium include: an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing a program. The program may be used by or in connection with an instruction executed system, apparatus or device.

The computer readable signal medium may include a data signal propagating in baseband or as part of a carrier wave, which carries a computer readable program code. Such propagated data signal may take any of a variety of forms, including but not limited to an electromagnetic signal, an optical signal, or any suitable combination thereof. The computer readable signal medium may also be any computer readable medium other than the computer readable storage medium, which may send, propagate, or transport a program used by or in connection with an instruction executed system, apparatus or device.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C++, as well as conventional Procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

It should be illustrated that, explanatory embodiments have been illustrated and described, it would be appreciated by those skilled in the art that the above embodiments are exemplary and cannot be construed to limit the present disclosure, and changes, modifications, alternatives and varieties can be made in the embodiments by those skilled in the art without departing from scope of the present disclosure.

What is claimed is:

1. A wake-on-voice method, comprising:
   acquiring a wake-up voice configured to wake up a smart terminal;
   performing an analysis on an acoustic feature of the wake-up voice by using a preset acoustic model and a preset wake-up word recognition network of the smart terminal, so as to acquire a confidence coefficient of the acoustic feature of the wake-up voice with respect to an acoustic feature of a preset wake-up word;
   determining whether the confidence coefficient falls in a preset range of moderate confidence coefficients, and if yes, uploading the wake-up voice to a remote server; and
   determining whether a linguistic feature obtained by analyzing the wake-up voice using a linguistic model in the remote server matches to a linguistic feature of the preset wake-up word, and if yes, receiving an instruction to wake up the smart terminal generated by the remote server;
   triggering a wake-up word customizing process according to an instruction from a user, the wake-up word customizing process comprising:
   receiving a preset audio data from the user;
   recognizing information related to a wake-up word custom triggering instruction and wake-up word data to be processed from the preset audio data;
   establishing one or more user prompt question related to the wake-up word custom triggering instruction and the wake-up word data to be processed according to the question;
   receiving an answer for each user prompt question from the user until a final wake-up word custom triggering instruction and final wake-up word data to be processed is determined;
   establishing a new wake-up word recognition network according to the final wake-up word custom triggering instruction and the final wake-up word data to be processed; and
   replacing the preset wake-up word recognition network with the new wake-up word recognition network.

2. The wake-on-voice method according to claim 1, wherein after it is determined that the linguistic feature obtained by analyzing the wake-up voice using the linguistic model in the remote server matches to the linguistic feature of the preset wake-up word, the wake-on-voice method further comprises:
   performing a training on the linguistic model in the remote server using the wake-up voice.

3. The wake-on-voice method according to claim 1, wherein after the confidence coefficient of the acoustic feature of the wake-up voice with respect to the acoustic feature of the preset wake-up word is acquired, the wake-on-voice method further comprises:
   if the confidence coefficient is greater than an upper limit of the preset range, performing an operation to wake up the smart terminal.

4. The wake-on-voice method according to claim 1, wherein performing an analysis on an acoustic feature of the wake-up voice by using a preset acoustic model and a preset wake-up word recognition network of the smart terminal, so as to acquire a confidence coefficient of the acoustic feature of the wake-up voice with respect to an acoustic feature of the preset wake-up word comprises:
   extracting the acoustic feature of the wake-up voice;
   performing an analysis on the acoustic feature of the wake-up voice according to the preset acoustic model, so as to acquire N states corresponding to the wake-up voice and likelihood values of the N states, where N is a positive integer; and determining a possibility of synthesizing the N states into the acoustic feature of the preset wake-up word from the preset wake-up word recognition network according to the likelihood values based on a viterbi algorithm, and regarding the possibility as the confidence coefficient.

5. The wake-on-voice method according to claim 1, wherein determining whether a linguistic feature obtained by analyzing the wake-up voice using a linguistic model in the remote server matches to a linguistic feature of the preset wake-up word comprises:
generating a text sequence corresponding to the wake-up voice by the linguistic model based on an analyzing result of the acoustic feature of the wake-up voice acquired by using the preset acoustic model; and
determining the text sequence corresponding to the wake-up voice as the linguistic feature of the wake-up voice, and matching the text sequence corresponding to the wake-up voice to a text sequence corresponding to the preset wake-up word.

6. The wake-on-voice method according to claim 1, wherein establishing the new wake-up word recognition network according to the final wake-up word custom triggering instruction and the final wake-up word data to be processed comprises:
replacing the linguistic feature of the preset wake-up word with a text sequence of the wake-up word to be processed that have been recognized from the wake-up word data to be processed when the wake-up word custom triggering instruction is to replace a wake-up word; or
adding the text sequence of the wake-up word to be processed that have been recognized from the wake-up word data to be processed into the remote server when the wake-up word custom triggering instruction is to add a wake-up word; or
deleting the text sequence of the wake-up word to be processed that have been recognized from the wake-up word data to be processed when the wake-up word custom triggering instruction is to delete a wake-up word.

7. The wake-on-voice method according to claim 6, wherein the trigger process of the wake-up word custom triggering instruction includes clicking a virtual button on a webpage and/or playing preset audio data.

8. A terminal, comprising:
one or more processors;
a memory;
one or more programs stored in the memory, that when executed by the one or more processors, cause the one or more processors to perform acts of:
acquiring a wake-up voice configured to wake up a smart terminal;
performing an analysis on an acoustic feature of the wake-up voice by using a preset acoustic model and a preset wake-up word recognition network of the smart terminal, so as to acquire a confidence coefficient of the acoustic feature of the wake-up voice with respect to an acoustic feature of a preset wake-up word;
determining whether the confidence coefficient falls in a preset range of moderate confidence coefficients, and if yes, uploading the wake-up voice to a remote server; and
determining whether a linguistic feature obtained by analyzing the wake-up voice using a linguistic model in the remote server matches to a linguistic feature of the preset wake-up word, and if yes, receiving an instruction to wake up the smart terminal generated by the remote server;
triggering a wake-up word customizing process according to an instruction from a user, the wake-up word customizing process comprising:
receiving a preset audio data from the user;
recognizing information related to a wake-up word custom triggering instruction and wake-up word data to be processed from the preset audio data;
establishing one or more user prompt question related to the wake-up word custom triggering instruction and the wake-up word data to be processed according to the question;
receiving an answer for each user prompt question from the user until a final wake-up word custom triggering instruction and final wake-up word data to be processed is determined;
establishing a new wake-up word recognition network according to the final wake-up word custom triggering instruction and the final wake-up word data to be processed; and
replacing the preset wake-up word recognition network with the new wake-up word recognition network.

9. The terminal according to claim 8, wherein the one or more processors are further caused to:
perform a training on the linguistic model in the remote server using the wake-up voice.

10. The terminal according to claim 8, wherein the one or more processors are further caused to:
if the confidence coefficient is greater than an upper limit of the preset range, perform an operation to wake up the smart terminal.

11. The terminal according to claim 8, wherein the one or more processors are further caused to perform an analysis on an acoustic feature of the wake-up voice by using a preset acoustic model and a preset wake-up word recognition network of the smart terminal, so as to acquire a confidence coefficient of the acoustic feature of the wake-up voice with respect to an acoustic feature of the preset wake-up word by:
extracting the acoustic feature of the wake-up voice;
performing an analysis on the acoustic feature of the wake-up voice according to the preset acoustic model, so as to acquire N states corresponding to the wake-up voice and likelihood values of the N states, where N is a positive integer; and
determining a possibility of synthesizing the N states into the acoustic feature of the preset wake-up word from the preset wake-up word recognition network according to the likelihood values based on a viterbi algorithm, and regarding the possibility as the confidence coefficient.

12. The terminal according to claim 8, wherein the one or more processors are further caused to determine whether a linguistic feature obtained by analyzing the wake-up voice using a linguistic model in the remote server matches to a linguistic feature of the preset wake-up word by:
generating a text sequence corresponding to the wake-up voice by the linguistic model based on an analyzing result of the acoustic feature of the wake-up voice acquired by using the preset acoustic model; and
determining the text sequence corresponding to the wake-up voice as the linguistic feature of the wake-up voice, and matching the text sequence corresponding to the wake-up voice to a text sequence corresponding to the preset wake-up word.

13. The terminal according to claim 8, wherein when the one or more processors are caused to establish the new wake-up word recognition network according to the final wake-up word custom triggering instruction and the final wake-up word data to be processed, the one or more processors are caused to:
- replace the linguistic feature of the preset wake-up word with a text sequence of the wake-up word to be processed that have been recognized from the wake-up word data to be processed when the wake-up word custom triggering instruction is to replace a wake-up word; or
- add the text sequence of the wake-up word to be processed that have been recognized from the wake-up word data to be processed into the remote server when the wake-up word custom triggering instruction is to add a wake-up word; or
- delete the text sequence of the wake-up word to be processed that have been recognized from the wake-up word data to be processed when the wake-up word custom triggering instruction is to delete a wake-up word.

14. The terminal according to claim 13, wherein a trigger mechanism of the wake-up word custom triggering instruction includes clicking a virtual button on a webpage and/or playing preset audio data.

15. A non-transitory computer readable storage medium storing a computer program, when the computer program is executed by a processor, configured to perform the wake-on-voice method including:
- acquiring a wake-up voice configured to wake up a smart terminal;
- performing an analysis on an acoustic feature of the wake-up voice by using a preset acoustic model and a preset wake-up word recognition network of the smart terminal, so as to acquire a confidence coefficient of the acoustic feature of the wake-up voice with respect to an acoustic feature of a preset wake-up word;
- determining whether the confidence coefficient falls in a preset range of moderate confidence coefficients, and if yes, uploading the wake-up voice to a remote server; and
- determining whether a linguistic feature obtained by analyzing the wake-up voice using a linguistic model in the remote server matches to a linguistic feature of the preset wake-up word, and if yes, receiving an instruction to wake up the smart terminal generated by the remote server;
- triggering a wake-up word customizing process according to an instruction from a user, the wake-up word customizing process comprising:
- receiving a preset audio data from the user;
- recognizing information related to a wake-up word custom triggering instruction and wake-up word data to be processed from the preset audio data;
- establishing one or more user prompt question related to the wake-up word custom triggering instruction and the wake-up word data to be processed according to the question;
- receiving an answer for each user prompt question from the user until a final wake-up word custom triggering instruction and final wake-up word data to be processed is determined;
- establishing a new wake-up word recognition network according to the final wake-up word custom triggering instruction and the final wake-up word data to be processed; and
- replacing the preset wake-up word recognition network with the new wake-up word recognition network.

* * * * *